United States Patent [19]
Koenck et al.

[11] Patent Number: 5,793,604
[45] Date of Patent: Aug. 11, 1998

[54] DATA COLLECTION TERMINAL WITH AN UPPER PORTION WIDER THAN A HAND-GRIP AND LOCATED OVER THE HAND-GRIP

[75] Inventors: Steven E. Koenck; Phillip Miller, both of Cedar Rapids; Arvin D. Danielson, Solon; Ronald L. Mahany, Cedar Rapids; Dennis A. Durbin, Cedar Rapids; Keith K. Cargin, Jr., Cedar Rapids; George E. Hanson, Cedar Rapids; Darald R. Schultz, Cedar Rapids; Robert G. Geers, Cedar Rapids; Darrell L. Boatwright, Cedar Rapids; William T. Gibbs, Cedar Rapids; Stephen J. Kelly, Marion, all of Iowa

[73] Assignee: Norand Corporation, Cedar Rapids, Iowa

[21] Appl. No.: 670,355

[22] Filed: Jun. 25, 1996

Related U.S. Application Data

[63] Continuation of Ser. No. 382,777, Jan. 31, 1995, Pat. No. 5,530,619, which is a continuation of Ser. No. 192,525, Feb. 4, 1994, Pat. No. 5,418,684, which is a continuation of Ser. No. 17,049, Feb. 12, 1993, abandoned, which is a continuation of Ser. No. 633,500, Dec. 26, 1990, Pat. No. 5,202,817, which is a continuation-in-part of Ser. No. 626,711, filed as PCT/US90/03282, Jun. 7, 1990, abandoned.

[51] Int. Cl.$^6$ .................. G06F 1/16; H05K 7/10; H05K 7/14
[52] U.S. Cl. .................. 361/680; 235/472
[58] Field of Search .................. 235/1 D, 145 R, 235/146, 432, 462, 472; 364/708.1, 709.1, 709.12; 361/679–681, 683, 728–731

[56] References Cited

U.S. PATENT DOCUMENTS

| | | | |
|---|---|---|---|
| 4,133,034 | 1/1979 | Etter | 235/432 X |
| 4,621,189 | 11/1986 | Kumar et al. | 235/472 |
| 4,845,650 | 7/1989 | Maede et al. | 361/680 |
| 4,983,818 | 1/1991 | Knowles | 235/472 |
| 5,418,684 | 5/1995 | Koenck et al. | 361/680 |
| 5,530,619 | 6/1996 | Koenck et al. | 361/680 |

Primary Examiner—Michael W. Phillips
Attorney, Agent, or Firm—Stanford & Bennett L.L.P.

[57] ABSTRACT

A portable, hand-held data collection terminal unit is of modular structure including among other modules a display screen module, a keyboard module and a base module, each of which may be chosen from a plurality of modules available for assembly into the terminal unit. Consequently, a wide combination of terminal units may be assembled from a comparatively limited number of modular choices, such that the cost of assembly of a terminal unit with specific functions may be minimized A particular selected module is a scanning module including a pivotable scanning head to permit a user to adjust the scanning head to a convenient position for operating the scanning module without sacrifice of visual access to a display screen of the display screen module. The display screen module may be selected from modules of standard width equal to the width of the terminal unit, of extended width extending when assembled to a selected keyboard module beyond either or both lateral edges of the terminal unit. The selected display screen module may include one of different sized screens, function keys and alphabetical keys.

68 Claims, 21 Drawing Sheets

DATA COLLECTION TERMINAL WITH AN UPPER PORTION WIDER THAN A HAND-GRIP AND LOCATED OVER THE HAND-GRIP

CROSS REFERENCE TO RELATED APPLICATIONS (Claiming Benefit Under 35 U.S.C. 120)

The present application Is a continuation of application Ser. No. 08/382,777, filed Jan. 31, 1995, now U.S. Pat. No. 5,530,619, issued Jun. 25, 1996; which is a continuation of application Ser. No. 08/192,525, filed Feb. 4, 1994, now U.S. Pat. No. 5,418,684, issued May 23, 1995, which is a continuation of application Ser. No. 08/017,049, filed Feb. 12, 1993, now abandoned; which is a continuation of application Ser. No. 07/633,500, filed Dec. 26, 1990, now U.S. Pat. No. 5,202,817, issued Apr. 13, 1993; which is a continuation-in-part of application Ser. No. 07/626,711, filed Dec. 12, 1990, now abandoned; which is a continuation-in-part of PCT application PCT/US90/03282, filed Jun. 7, 1990, which entered the U.S. national stage as application Ser. No. 07/777,393 with a filing date of Dec. 6, 1991, and an effective date of Jan. 7, 1992, now U.S. Patent No. 5,410,141, issued Apr. 25, 1995.

INCORPORATION BY REFERENCE

The descriptive matter of the above-referred to PCT application PCT/US90/03282, filed Jun. 7, 1990, including forty-six pages of specification and nineteen sheets of drawings including FIGS. 1 through 37, is incorporated herein by reference in its entirety, and is made part of this application.

BACKGROUND OF THE INVENTION

This invention relates generally to data collection systems, and more particularly to such systems wherein a hand-held unit may be operated to collect data, to selectively process, and to communicate collected data within such systems by various automated or manual operations. A typical automated process which may be included in such operations relates to collecting data by scanning bar code data with a laser scanning device. Subsequently, the collected data or information may be processed such as by becoming included in a data base. In another operation, it may be desired to communicate the information to another unit within a respective data collection system.

Various investigatory efforts in this area have shown that some functional applications of the data collection systems may require certain features on such hand-held units which may not at all be required in other functional applications. Going toward specialization of the units for specific tasks, the cost of operating the data collection systems tends to become more and more prohibitive as systems become configured to accommodate various specific applications. On the other hand, when data entry units are mass produced for general applications, efficiency in the application is jeopardized and compromise on various features results in less than the most efficient data handling procedures. It is consequently desirable to provide a data collection system in which hand-held units are equipped with features relating to particular needs without having a prohibitively high price tag.

SUMMARY OF THE INVENTION

The PCT application Ser. No. 90/0382, filed Jun. 7, 1990, assigned to and owned by the assignee of the present application, the descriptive matter of which is incorporated herein by reference in its entirety, refers to a modular hand-held unit and discloses a manner of attaching one functional module to another.

In accordance with the present invention, a selected one of a plurality of special purpose functional modules may be attached to another module of one of a selected second functional configurations to configure a plurality of different modules of different specific functional features. Thus, according to one aspect of the invention, with a reasonable number of functional modules a great number of differently configured modules may be provided.

A hand-held data collection terminal unit includes an elongate housing having a lower .portion supportable in the hand of a user and an upper portion facing such user when the terminal is in a typical use position. The upper portion includes a keyboard and a display screen. In accordance with the invention, the hand-held terminal comprises a plurality of modules in which a base module extends longitudinally and includes inner and outer end caps of the terminal. The inner end cap is disposed on the end of the terminal which typically points toward a user when the terminal is in use, the outer end cap being disposed on opposite end of the terminal. A keyboard module is defined as an intermediate module disposed adjacent the base module and between the end caps. A display screen module is further disposed adjacent the intermediate module and adjacent the outer end cap of the base module.

According to a more particular aspect of the invention, the display screen module extends from the outer end cap of the base module longitudinally toward an end intermediate of the inner and outer end caps, such that a portion of the keyboard module remains exposed and features an array of manual input keys arranged in an area between the display screen module and the inner end cap.

According to another aspect of the invention, a data collection terminal unit includes a base module, a keyboard module disposed adjacent the base module and substantially of the same length and width as the base module. A display screen module is disposed adjacent the keyboard module and is disposed over at least one key arrangement of the keyboard unit. The display screen module is slidably arranged to be selectively slidable outward away from a user and from such at least one key arrangement to expose such keys for user access when the terminal unit is being placed into use.

According to yet another aspect of the invention, it is desired to protect the modular hand-held units from damage when the units are accidentally dropped. Resilient end caps and a layered resilient interface extending peripherally beyond substantial molule portions impart shock absorbing qualities to the modular hand-held units.

According to a further aspect of the invention, a scanner module is attached as an end cap module to an outer end of a modular hand-held terminal unit. The scanner module includes a scanner head which is rotatable about a longitudinal axis of the modular hand-held terminal unit and selectively adjustable to one of a plurality of user positions in which the scanner may conveniently be used to collect data from, for example, bar code labels while a display screen on a display screen module remains in view of the user of the terminal unit.

In further describing the various features and advantages of the invention and of particular hand-held terminal units including and embodying features of the invention, the following spacial relations are being followed. Directional indications refer to a normal position of use of a hand-held data collection terminal. In such position the user would hold the terminal or terminal unit such that a display screen faces "up" into the direction of view of the user. Similarly, a keyboard would normally face up to be visible and manually accessible to a user. Correspondingly, the upper face of a data collection terminal unit is also referred to as a frontal side or face. The opposite side or portion of the unit is referred to as the rear or bottom portion of the unit and the direction in which the rear portion faces is the "lower, bottom or down" direction, or term of similar import. Also of interest are the descriptors at opposite ends of a longitudinal axis through a terminal unit. With the keyboard and display screen facing up, the longitudinal end of the terminal unit typically facing away from the user will be referred to and denoted as an "outer" end, while an opposite end of the unit directed toward the user when the unit is in a general position as described, is referred to as an "inner" end. These references should be kept in mind when reading the following detailed description.

Various other features and advantages of the data collection terminal in accordance with the invention will become apparent from the following detailed description, which may be best understood when read with reference to the appended drawings.

DETAILED DESCRIPTION OF THE INVENTION

Figure 1:
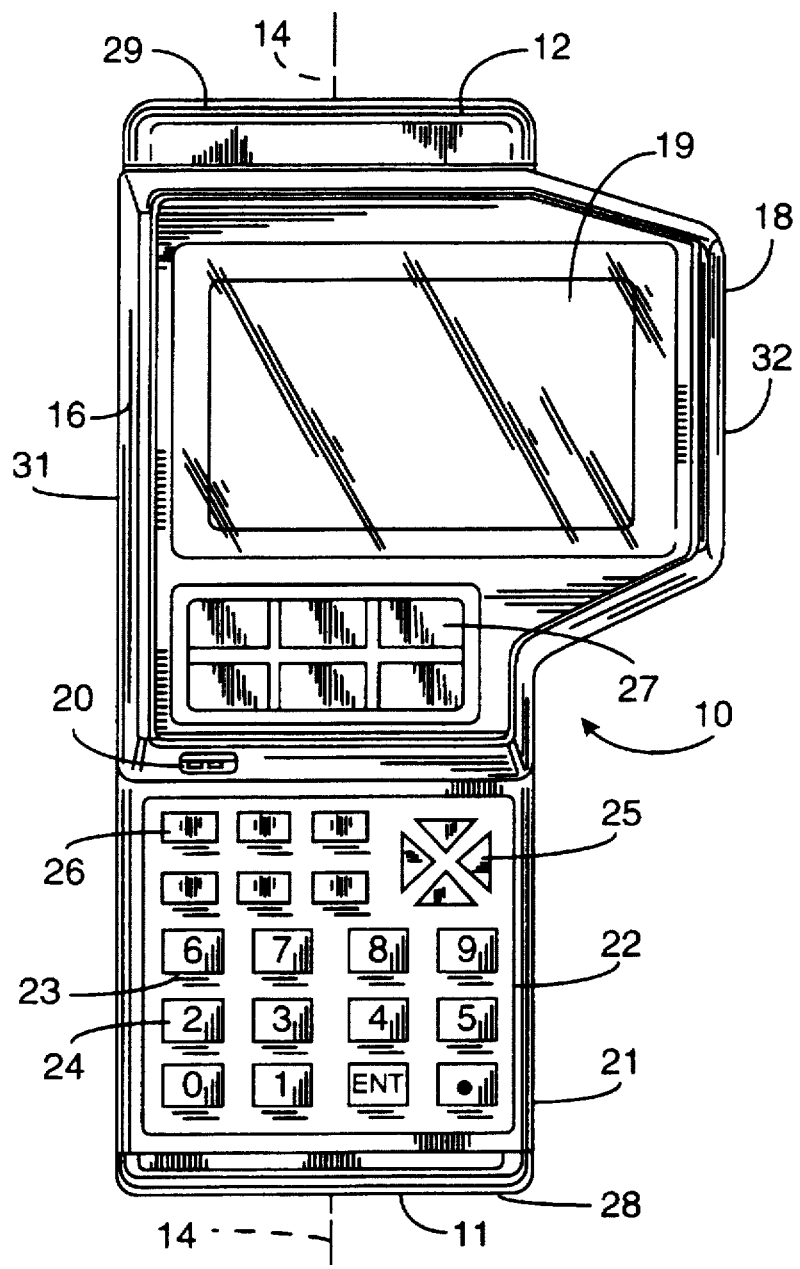
FIG. 1 shows a frontal view of a modular data collection terminal unit having a display screen module which is enlarged to one side of a generally elongate shape of the terminal unit.

Referring to the various illustrations in sequence, a data collection terminal unit which is designated generally in FIG. 1 by the numeral 10, is shown as undergoing various changes and modifications as selected different modules may be substituted for other modules and functions and capabilities of the data collection terminal unit 10 are correspondingly altered.

In reference to FIG. 1, there is shown a frontal view of the data collection terminal unit 10. In furtherance of advantages and objects of the invention, the data collection terminal unit 10 is a modular unit in that a plurality of modules become attached to each other to form the terminal unit 10. A general shape of the terminal unit 10 is an elongate rectangular shape as can be ascertained from the drawing. The terminal unit has an inner end 11 which typically is closest to a person using the terminal unit 10 when the terminal unit is in a typical hand-held operating position in which a user exposes a keyboard and a display screen toward the line of sight. Opposite the inner end 11 an outer end 12 of the data collection terminal unit is directed away from a user when the terminal unit 10 is hand-held in a typical use position.

The general shape of the terminal unit is that of an elongated rectangle, such that a hypothetical longitudinal centerline or central axis indicated at 14 can be envisioned to extend in the longitudinal inward-outward direction of the terminal unit 10. The frontal view shows a display screen module 16 which is enlarged to one side of the terminal unit 10. A lateral extension 18 of the display screen module is in the preferred embodiment shown to extend toward the right hand side of the central axis 14 beyond the generally elongate rectangular shape of the terminal unit 10. The direction may be one of convenience to a user. The lateral extension, whether toward the left or right of the longitudinal axis 14 extends the line width of the viewing area of a display screen 19 of the module 16. Such extension 18 is desired to permit an alphanumeric instruction to be contained within a single character line of display, for example. The display screen module 16 further may include a main power switch 20, in that in various configurations of the terminal unit 10 a display screen module or its equivalent would be included. Below the display screen module 16, and inwardly disposed, lies a keyboard module 21. The keyboard module 21 includes a particular keyboard 22 which may typically include an arrangement 23 of numerical keys 24. The numerical keys 24 are desirably supplemented by a cluster of cursor keys 25 and by selected function keys 26. The keyboard module 16 may also include a cluster of further function switches 27. It should be understood that the modules 16 and 24 are mechanically attached to and part of the terminal unit 10 and are further electrically interconnected, such as may conveniently be achieved by typical flat cables and respective connectors, not shown. It is therefore convenient to provide cursor movement keys, such as the keys 25 as part of the keyboard, in that it is typically intended for the terminal unit 10 to feature a display screen module.

Further in accordance with the invention, the terminal unit 10, the unit being typically hand-held, is subject to accidentally being dropped. To protect the terminal unit 10 from damages when dropped an established height, resilient end caps 28 and 29 cover the inner end outer ends 11 and 12, respectively. In addition, it has been found desirable to protect lateral ends of the display screen module 16 similarly with resilient strips 31 and 32.

Figure 2:
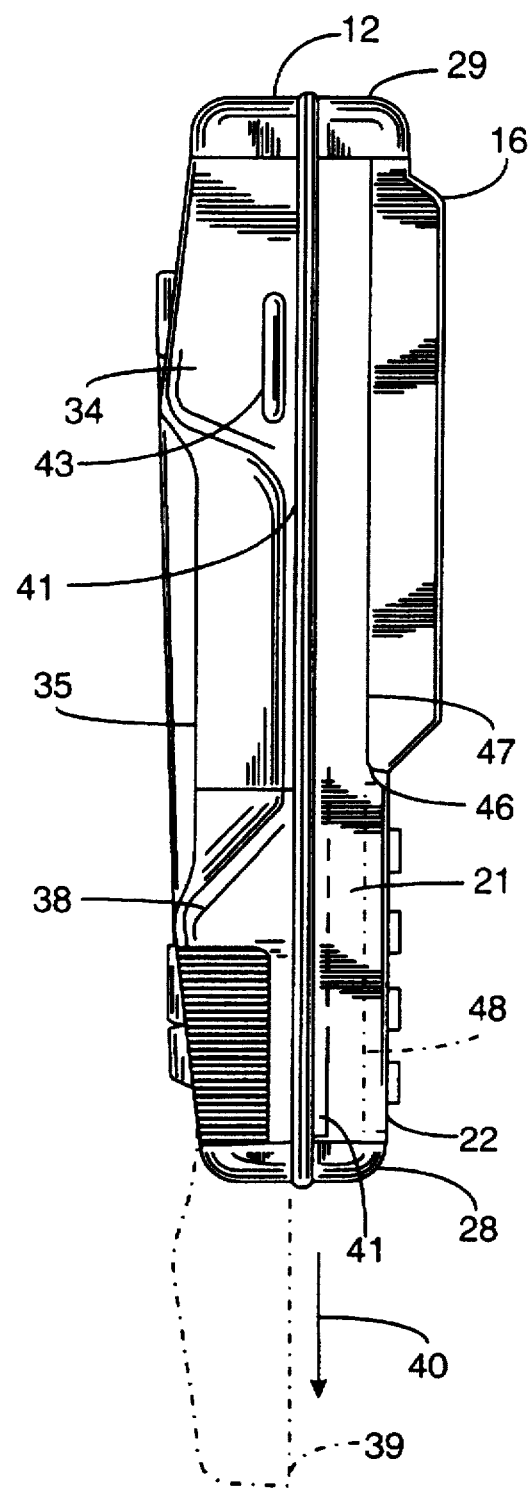
FIG. 2 is a side view of the data collection terminal unit shown in FIG. 1.

FIG. 2 is a side view of the data collection terminal unit 10. The side view of the terminal unit 10 further illustrates the modular construction of the terminal unit 10. A base module 34 desirably includes a central handgrip portion 35 and may further include a resilient strap 36, such that a user may insert the hand between the handgrip portion 35 and the resilient strap. A battery compartment 38 is shown at the lower, inner end of the base module 34. In that the terminal unit is a hand-held unit, an internally disposed electrical power source such as a battery module 39 is virtually required for desired operation of the terminal unit. In one configuration, the battery compartment comprises an opening into which the battery module 39 is inserted. The external shape of the battery module conforms to the shape of the base module to form part of it. The battery module 39 is desirably replaceable in a field exchange operation and may be removed by sliding the module 39 in the direction of the arrow 40. To secure the battery module within the base module 34, a locking mechanism which may be opened and closed by a coin, for example, is found to facilitate such replacement. A peripheral resilient strip or spacer 41 preferably overlies the base module 34 and functions as a shock absorber when the terminal unit 10 is accidentally dropped on its side surfaces. Adjacent the outer end of the handgrip portion 35 is disposed a function key 43. The function key 43 may be a data entry initiation key or a scanner operation control key when the terminal unit is equipped with a scanner module. It should be noted, that the function key 43 is disposed for persons holding the terminal unit in their right hand, such that the index finger of the user's right hand may be used to operate the key 43. The base unit may be furnished with a similar key 43, not shown, on the opposite side of the base module 34 to allow a person holding the unit with the left hand to operate such key. The respective keys would be electrically coupled to function in parallel, such that the desired function can be initiated from either side of the terminal unit 10. Disposed between the resilient end caps 28 and 29 and adjacent the resilient spacer 41 is the keyboard module 21. The keyboard module 21 functions consequently as a mounting base for the display screen module 16. A recess or step 46 in the upward facing surface 47 of the keyboard module 21 seats the display screen module 16. The display screen module 16 is preferably attached by typical screw type fasteners through the keyboard module 21. The keyboard module 21 in turn may be fastened in a similar manner from the bottom surface of the base module 34. In accordance with the invention, the keyboard module 21 further comprises a recess 48 for receiving one of a number of differently configured versions of the keyboard 22. The selected keyboard 22 is also attached through the body of the keyboard module 21 with respective fasteners, such as screws, for example.

Figure 3:
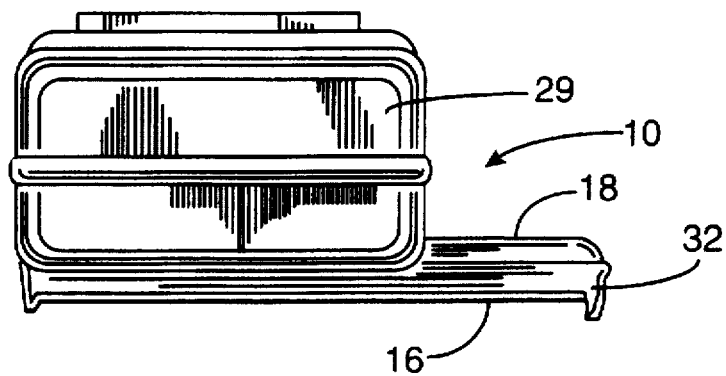
FIG. 3 is an outer end view of the data collection terminal unit shown in FIG. 1.

FIG. 3 is an outer end view of the data collection terminal unit 10. The need for the referred to resilient protective strip 3220 may be realized in viewing lateral extending portion 18 of the display screen module 16.

Figure 4:
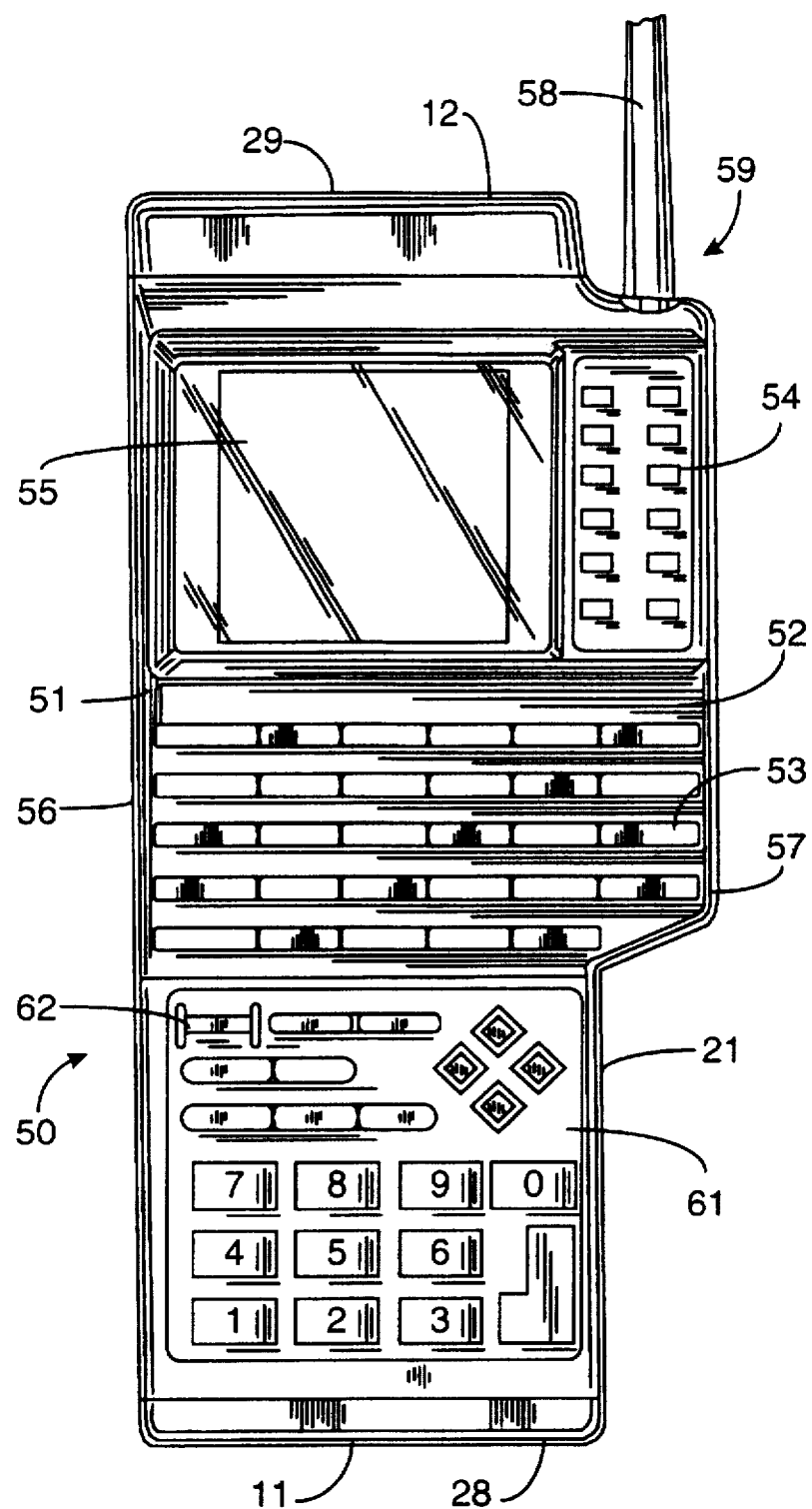
FIG. 4 is a frontal view of an alternate embodiment of a data collection terminal unit such as shown in FIG. 1, the alternate embodiment showing additional features including an RF communications capability, as indicated by an antenna extending laterally of the longitudinal body of the data collection terminal unit.

FIG. 4 is a frontal view of a data collection terminal unit 50 which is an alternate embodiment of the terminal unit 10. In particular, the terminal unit 50 comprises a display screen module 51 including an arrangement 52 of alphabetical keys 53. The display screen module 51 further includes an arrangement of function keys 54 disposed vertically along a display screen 55. To accommodate the key arrangement 52, the display screen module 51 is also laterally extended-as the display screen module 16. Consequently, lateral resilient strips 56 and 57 are preferred to increase the drop resistance of the terminal unit 50 as previously discussed with respect to the terminal unit 10. Because of the area occupied by the keys 52 and the function keys 54, the display screen is does not extend beyond the lateral sides of the generally elongate shape other than the extended display screen display module 51. The terminal unit 50 further shows an outwardly extending antenna 58 as part of and evidencing a radio frequency communication system 59 being part of the terminal unit 50. As described with respect to the terminal unit 10, the terminal unit 50 also includes the resilient end caps 28 and 29. A keyboard 61 may be functionally different than the previously described keyboard 22, though it may be fitted into the aforementioned recess 48 of the keyboard module 21. In particular, the keyboard 61 shows a main power switch 62, rather than having such switch associated with the display screen module 51. As can be ascertained from the terminal unit 50, modules such as the keyboard module 21 may be interchangeably used with one of a number of display screen modules, such as the modules 16 and 51.

Figure 5:
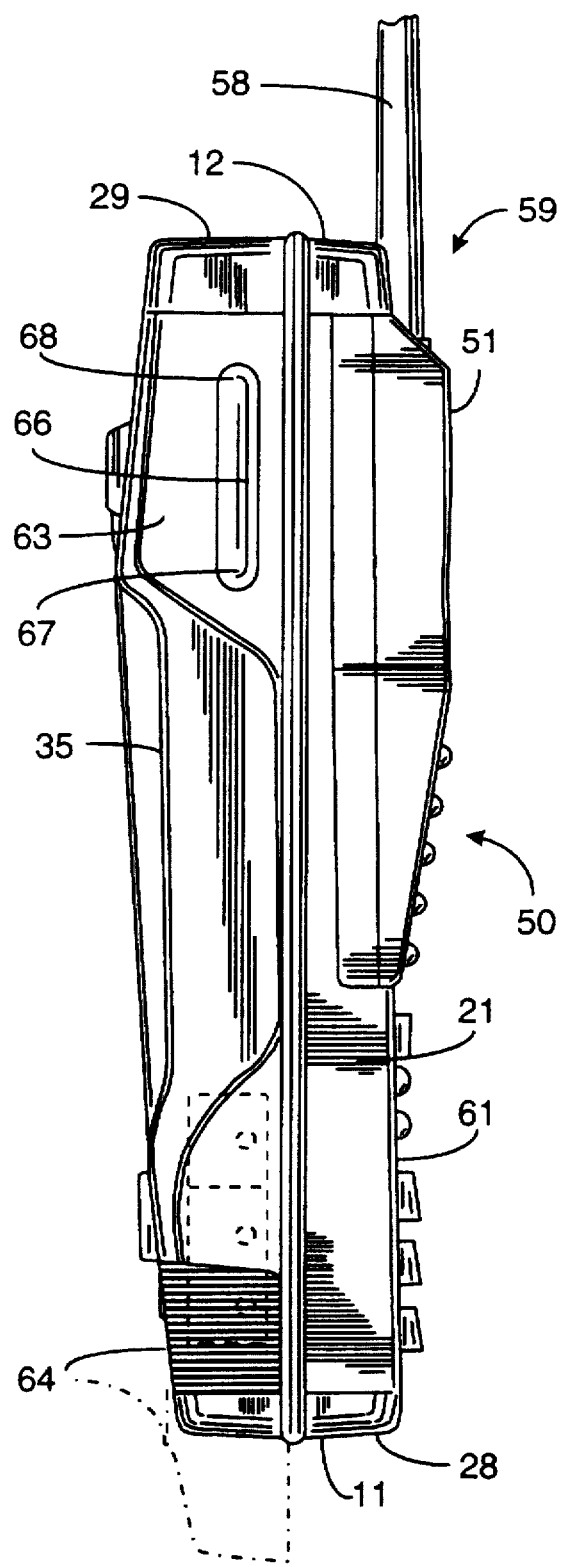
FIG. 5 is a side view of the data collection terminal unit shown in FIG. 4.

FIG. 5 is a side view of the data collection terminal unit 50. A base module 63 may in outer dimensions be the same as the base module 34 described with respect to FIG. 2. One difference may be noted in the configuration of a battery module 64 with respect to the configuration of the battery module 39. The battery module 64 shows less external surface and is inserted for a substantial portion into the base module 63. The central handgrip portion 35 of the base module is in essence identical in both base modules. Another notable difference relates to a laterally disposed outer function key 66 which preferably may include more than one function, such as an enter function and scan function. The function key may be operated to enter data and to operate a scanning module when such a scanning module is provided. To operate the enter function, an inner end 67 of the function key 66 is depressed. To operate the scanning function an outer end 68 may be depressed. The respective, inner and outer locations are assigned because of a preferred addition of a scanner module in lieu of the outer end cap 29. As described with respect to the function key 48, the function key may be provided on either or both sides of the respective base modules. When the function keys are not provided, they may be deleted and replaced by a plug (not shown) which would be installed in lieu of the function switch. Also to be observed is the one for one replacement of the display screen module 51 for the previously described display screen module 16 into the keyboard module 21.

Figure 6:
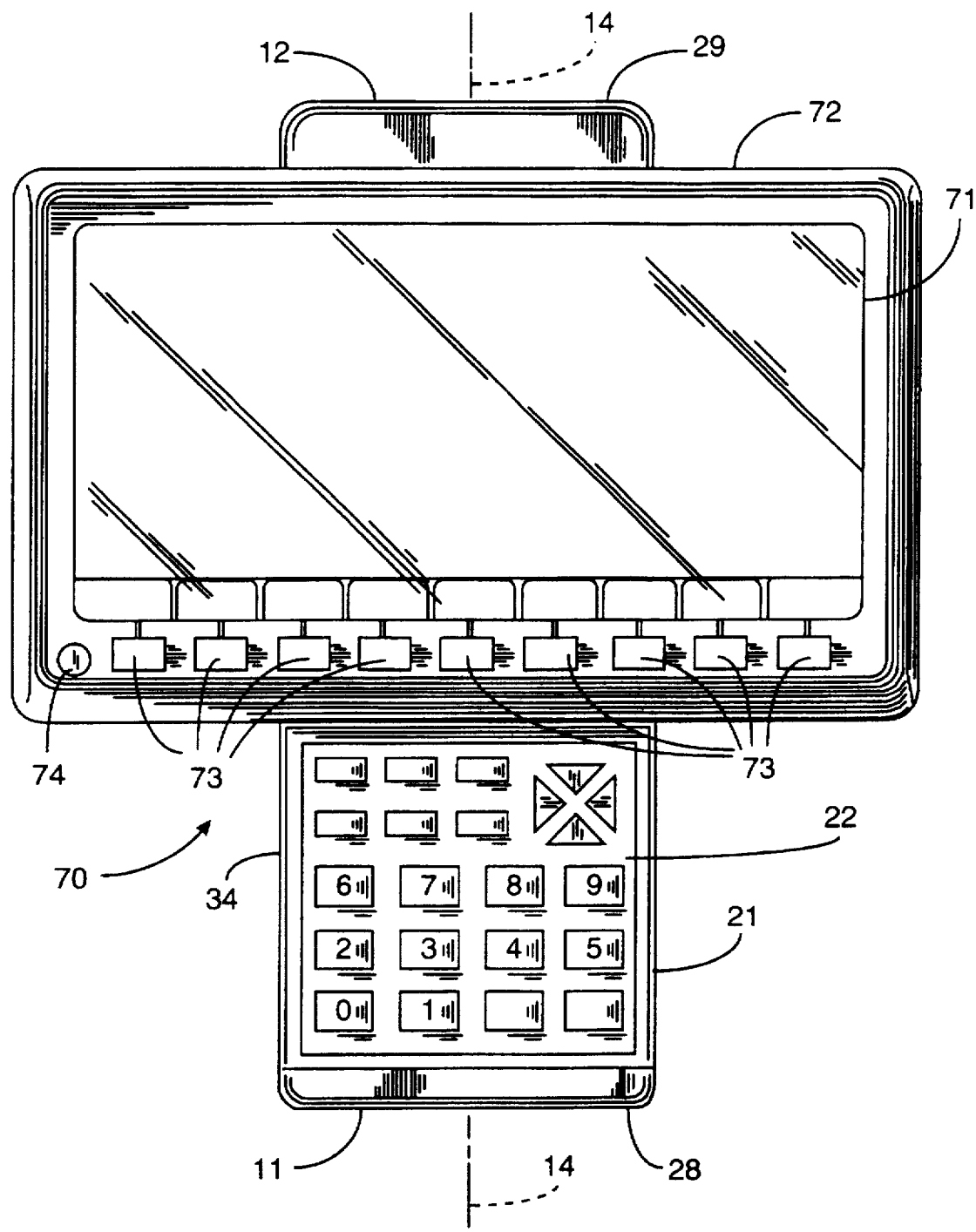
FIG. 6 is a frontal view of yet another embodiment of a data collection terminal unit in accordance with the invention, the terminal unit showing a display screen which extends laterally beyond the basic longitudinal shape of the terminal unit.

FIG. 6 is a frontal view of yet another terminal unit 70, having a uniquely wide screen 71 disposed in a display screen module 72. The display screen module 72 is mounted in the manner described with respect to the display screen module 16 to the keyboard module 21. The display screen module 72 extends to both sides with respect to the central axis 14 of the terminal unit 70 beyond the width of the base module 34 or 66 and the keyboard module 21. The size of the display screen 71 permits only a limited number of function keys 73 which are preferably disposed adjacent the outer edge of the of the keyboard 22. The display screen module 72 may also include a power switch 74 when such a function is not part of the keyboard module 21 and its respective keyboard 22. It should be realized, however, that without diminishing the width of the display screen 71, the number of display lines thereon may be diminished to include on another display screen module an alphabetical keyboard.

Figure 7:
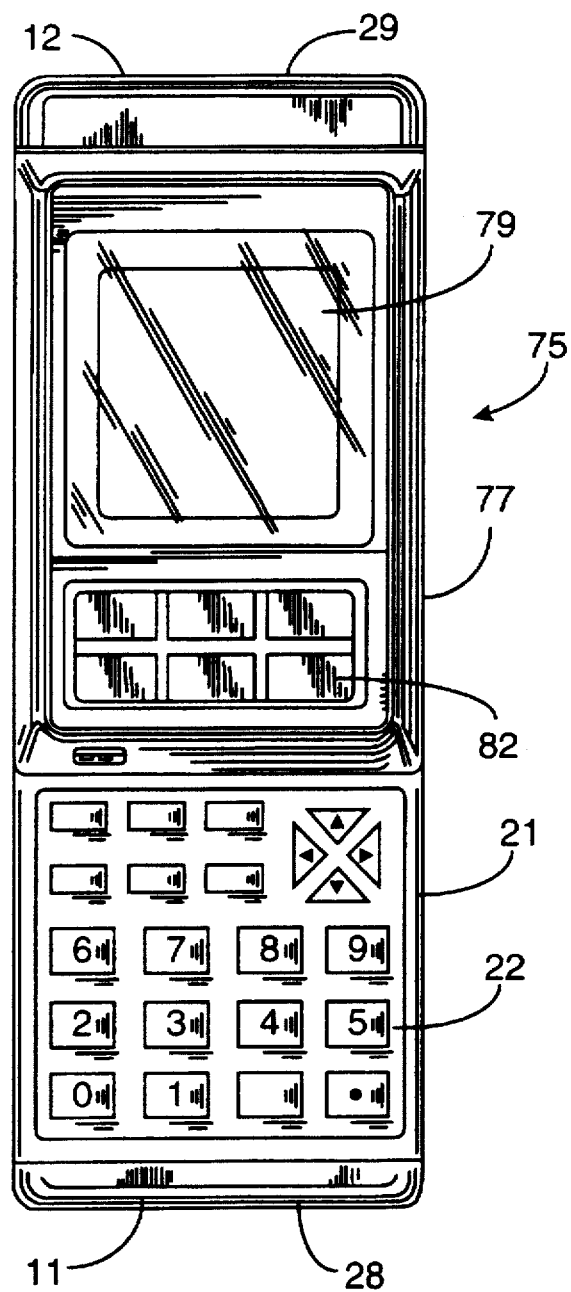
FIG. 7 is a frontal view of a data collection terminal unit similar to the terminal unit shown in FIG. 1, except that a display screen module is shown which is confined to the generally longitudinal shape of the data collection terminal unit.
Figure 8:
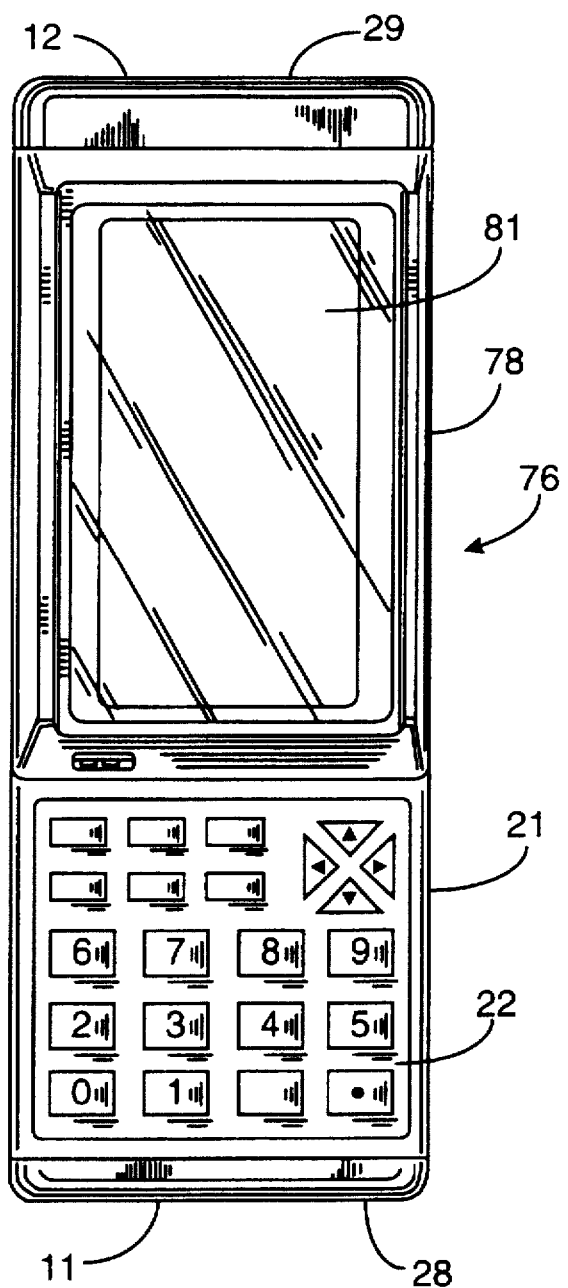
FIG. 8 is a frontal view of another embodiment of a data collection terminal unit in which the display screen module of the the terminal unit in FIG. 7 has been replaced by an elongate display screen module in which function or control keys have been eliminated to afford room for added display area of the display screen.

FIGS. 7 and 8 show terminal units 75 and 76, respectively. Both terminal units show display screen modules 77 and 78, respectively, in which respective display screens 79 and 81 are contained within the lateral bounds of the keyboard module 21. The display screen module 77 includes function keys 82, arranged in an earlier referred to arrangement. In contrast, the display screen module 78 does not include the function keys 82 but is instead in the direction between the inner and outer ends 11 and 12 of the terminal unit 76, hence in the vertical direction of the display screen enlarged. Thus, FIGS. 7 and 8 show further embodiments of the terminal unit that can be provided with only minor modifications in the assembly of the respective units.

Figure 9:
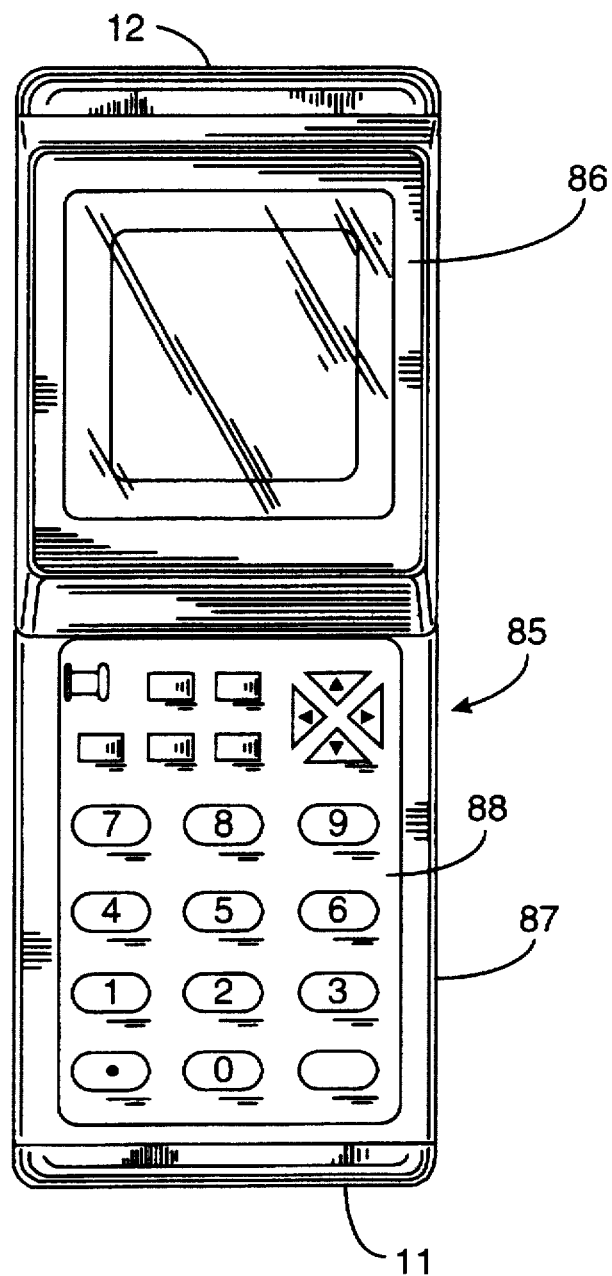
FIG. 9 is a frontal view of a data collection terminal unit showing a first keyboard array adjacent an inner end of the terminal unit and a display screen module adjacent an outer end of the terminal unit.
Figure 10:
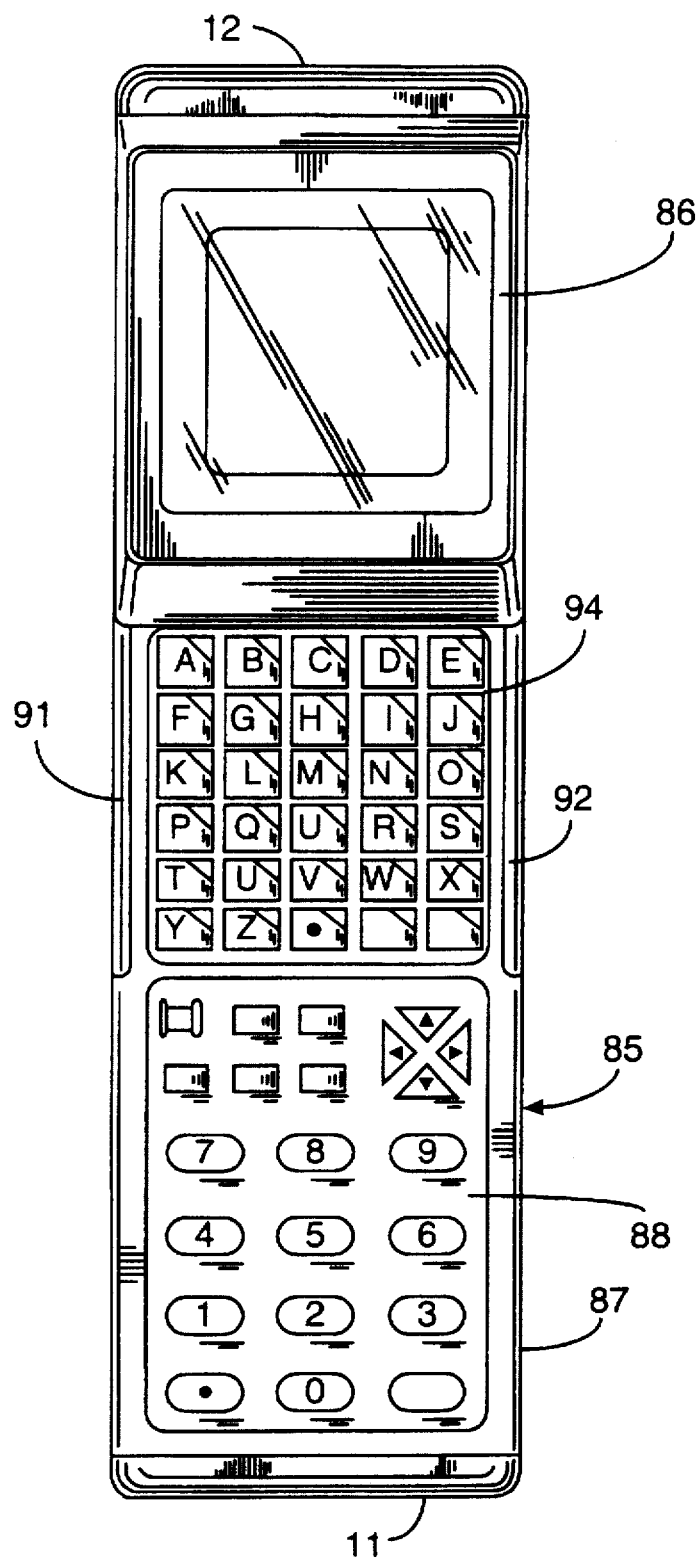
FIG. 10 is a frontal view of the data collection terminal unit shown in FIG. 9, in which the display screen module has been extended outwardly away from the user to uncover a second keyboard array which is in the non-extended position of the display screen module disposed beneath such module.

FIG. 9 is a frontal view of a data collection terminal unit 85 which features a variation of the described keyboard and display screen modules. The terminal unit 85 includes a display screen module 86 and a keyboard module 87. As in the previously described terminal units, the keyboard module 87 extends substantially between the inner and outer ends 11 and 12 of the terminal unit 85. A first keyboard 89 is mounted into an innermost end of the keyboard module 87. However, the display screen module 86 is outwardly slidably mounted to slide from an innermost position as shown in FIG. 9 to an outermost position shown in FIG. 10. Sliding motion is supported by rails 91 and 92 disposed along opposite sides of the terminal unit 85. In the outermost position of the display screen module 86, a second keyboard 94 is uncovered, in that the second keyboard is located directly adjacent the innermost position of the display screen module 86. The second keyboard 94 may be received by the keyboard module 87 in a recess similar to the keyboard 88. The first and second keyboards may be of different heights between inner and outer ends, or the keyboards may be configured to be of equal height. In such a configuration the keyboard module may be provided with proper recesses which are of the same size. In the described embodiment, the first keyboard has a greater vertical height than the second keyboard, and respectively differently sized cavities for receiving the first and second keyboards 88 and 94 are provided. The differences in size may prevent an inadvertent switching of the respective keyboards 88 and 94 during assembly of the terminal unit 85.

Figure 11:
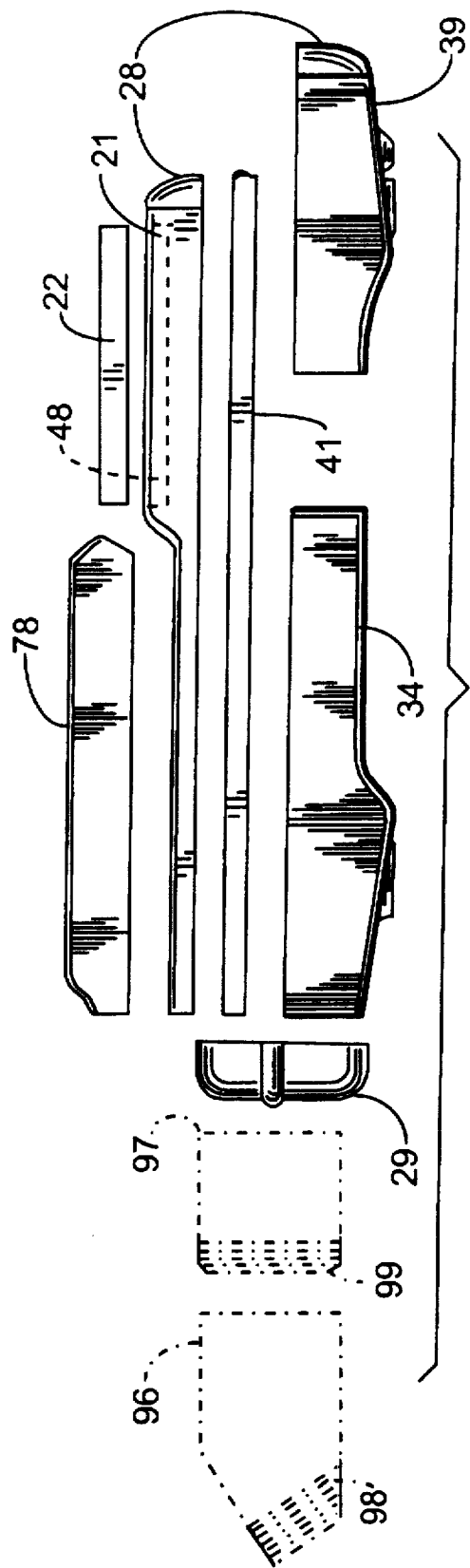
FIG. 11 is a schematic representation of various modules and elements of the terminal unit showing a basic manner of assembling selected ones of the various modules to each other.

FIG. 11 is a schematic representation of various modules and elements of the described terminal units showing a basic manner of assembling selected ones of the various modules to each other. In particular, the base module 34 is shown adjacent the battery module 39. The two modules may be combined initially or at a later time in that it is contemplated to facilitate the replacement of the battery module 39 without further disassembly of the respective terminal unit. The resilient spacer 41 is preferably a rubber compound which may be of a hardness to absorb a typical fall of the unit. The spacer 41 is assembled between the base module 34 and the keyboard module 21 or a similar keyboard module. A selected keyboard and display screen module is assembled to the selected keyboard module prior to its assembly to the base module 34 or its selected equivalent base module. The outer end cap 29 may be removed or initially deleted from the assembly and a CCD type scanner module 96 or a laser scanner type module 97 may be attached to the outer end 12 of the terminal unit. FIG. 11 shows such scanner modules 96 and 97 in phantom lines as alternative additions to the respective terminal unit. In maintaining the shock absorbing characteristics of the assembled terminal unit, such as terminal unit 10, if a scanner module, such as shown at 96 or 97, is included at the outer end 12 of the terminal unit 10, the scanner modules are desirably furnished with an resilient end cap 98 or 99, respectively.

Figure 12:
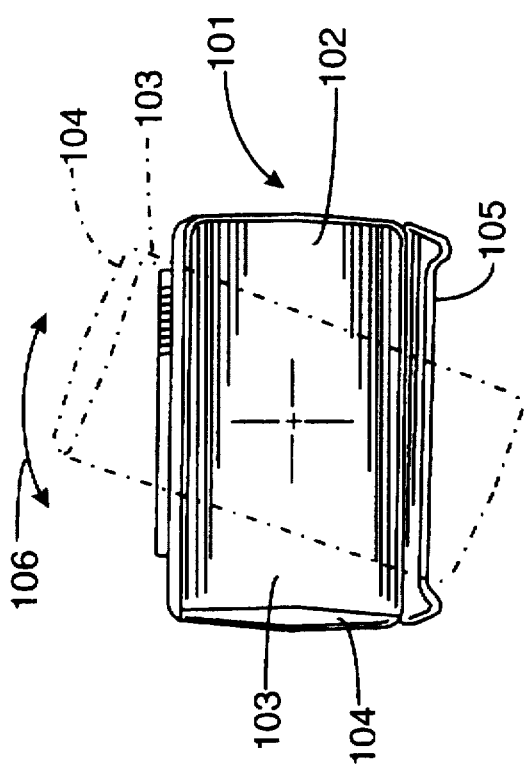
FIG. 12 is a somewhat simplified view of a data collection terminal unit in which a scanner module is mounted to an outer end of the terminal unit, the scanner module including a scanner head which is mounted to rotate about a longitudinal axis of the data collection terminal unit.

FIG. 12 is a simplified view onto an outer end 12 of a data collection terminal unit 101 in which a scanner module 102 is mounted to the outer end. The scanner module 102 is shown in a rest mode in which the scanner is less likely to be operated. The scanner module 102 has a scanning head 103 including an optical opening 104 through which scanned data are acquired. In the typically inactive position of the scanner module 102, any scanning would be done with the optical opening pointing toward one side of the terminal unit 101. In such position a user is not able to direct the scanning operation straight ahead while at the same time viewing a display screen 105 on the upper face of the terminal unit 101. To overcome the limitation, the scanning head 103 is rotatably or pivotably attached to the scanner module 102 to pivot about the longitudinal central axis 14 through the terminal unit 101. Preferably, the scanning head 103 may be moved to a number of intermediate positions between the lateral positions in which the optical opening 104 points to either side of the terminal unit 101. A particular number of positions, such at fifteen degrees increments may be preferred. Thus, between opposite extreme lateral positions, the scanning head may be pivoted through an angle of at least 180 degrees. An alternate, angularly disposed orientation of the scanning head 103 is shown in phantom lines as an example of the pivotable movement of the scanning head 103. The pivotable movement in either direction from the alternate position shown is indicated by an arrow 106.

Figure 13:
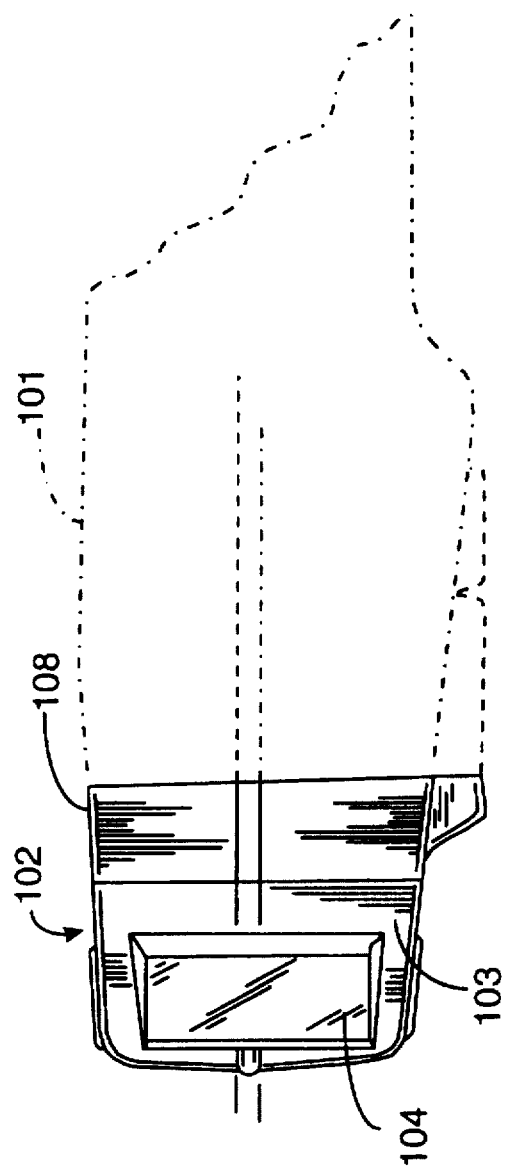
FIG. 13 is a side view of a scanner module, such as in FIG. 12, shown with the scanner head in a typical, laterally disposed rest position.

FIG. 13 shows a side view of the data collection terminal unit 101. The scanner module 102 may be attached to the outer end of the data terminal unit by removing the end cap 29 and attaching in its place a mounting base 108 of the scanner module 102. Internal data communications connections which are not shown, would include a typical data bus coupled to the microprocessor control of the data collection terminal unit 101 to permit the scanner module 102 to be operated as an integral element of the data collection terminal unit 101. The position in which the scanning head 103 is shown, is a typical rest position for the scanner module, in which the scanner would be least likely to be operated.

Figure 14:
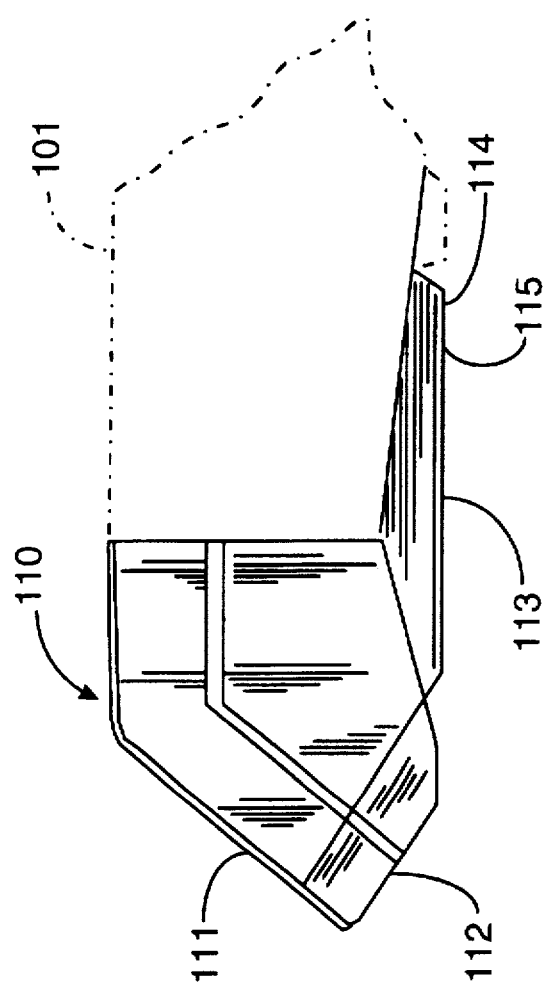
FIG. 14 is a side view of an alternate embodiment of a scanner unit, the scanner unit being fixedly attached to an outer end of the terminal unit and having a viewing direction at an angle with respect to the longitudinal axis of the data collection terminal.

FIG. 14 is a side view of an alternate embodiment of a scanner module 110. Contrary to the scanner module 102, the scanner module 110 is not pivotally attached by the base 108. Instead, a fixed scanner head 111 is shown, in which the direction of scanning may preferably at an angle in a range about 45 from the longitudinal axis of the data collection terminal unit 101 is preferred. To increase the shock absorbency of the scanner module outer surface, a window portion 112 of the scanner head 111 is protected at its outer rim with preferred rubber cushioning, a shock damper having been found supportive of preventing breakage of the data collection terminal unit 101 and particularly of the scanner head 101. The scanner module 110 further comprises an inward extension 113 adjacent a lower surface 114 of the data collection terminal unit 101. A threaded fastener 115 may be used to fasten the extension 113 to the underside 114 of the data collection terminal unit 101. It should be recognized that other modifications and changes may be made with respect to the laser scanner heads attached to the outer end of the data collection terminal unit in furtherance of the objects of the invention.

Figure 15:
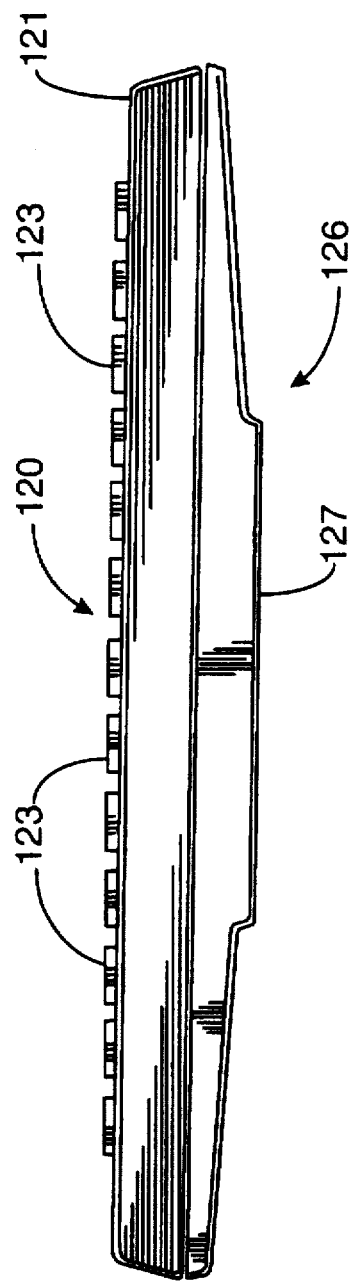
FIG. 15 is an end view of a display screen module of the type shown in FIG. 6, the end view showing an attachment surface of the display screen module.

FIG. 15 is an end view of a display screen module 120 of the type of display screen module 72 shown in FIG. 6. The end view shows an upwards directed display screen surface 121, also showing in profile a plurality of keys 123 which may be a combination of alphanumeric keys and function keys for implementing functions of the display screen module 120. Also shown as an edge view or in profile is a sculptured lower surface 126 of the display screen module 120. Preferably, a central portion 127 of the lower surface 126 is a flat surface portion of substantially the same width as an interface surface of the respective keyboard module to which the display screen module typically mounts.

Figure 16:
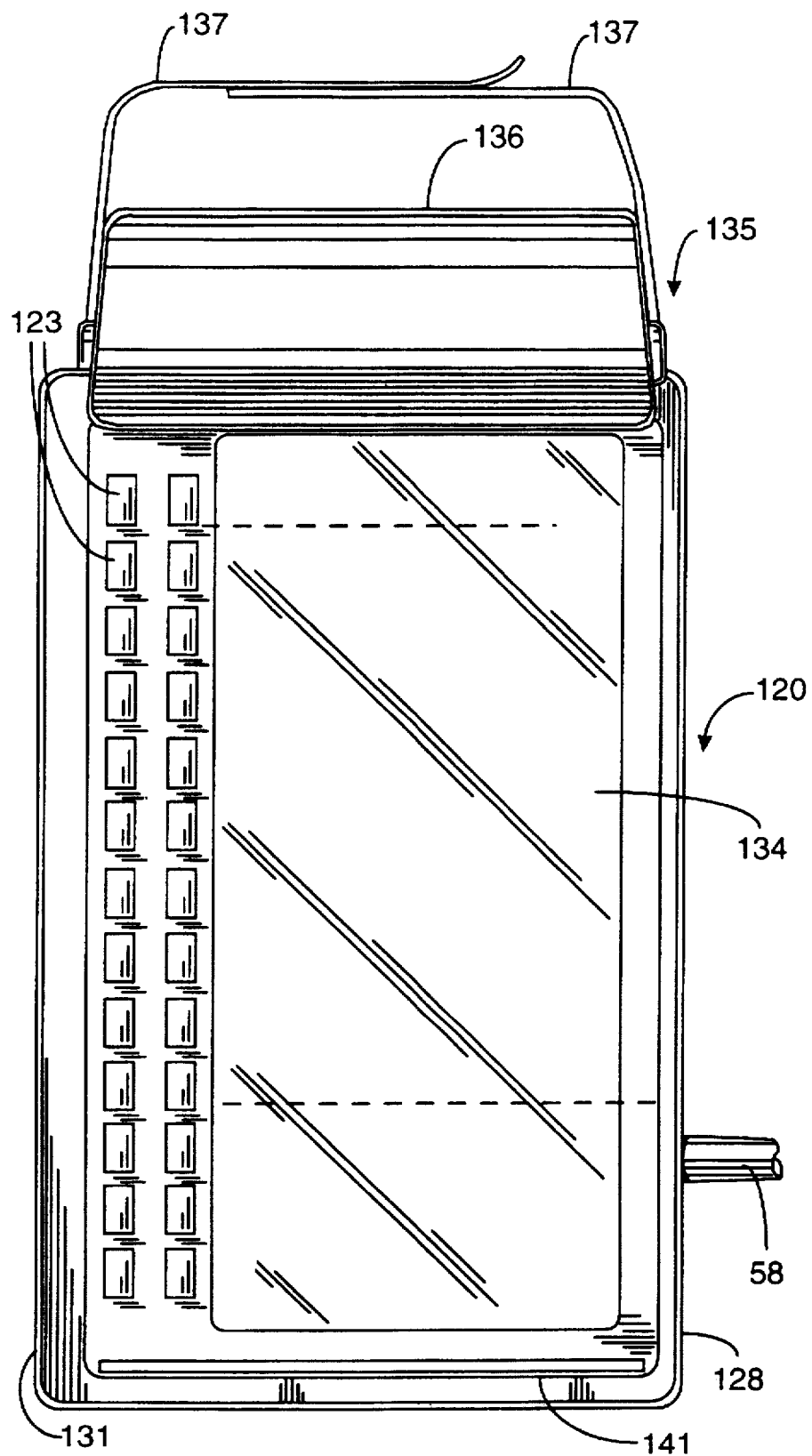
FIG. 16 is a frontal view of the display screen module of FIG. 15 in combination with a handle and Dower supply module.

FIG. 16 shows a frontal view of the display screen module 120. An outer end 128 of the display screen module 120 may feature an antenna, such as the antenna 58 of the transceiver unit 59 shown in FIG. 4, for example. Adjacent an inward facing edge 131 of the display screen module 120 may be located an array of the plurality of keys 123 which may be alphanumeric, of numeric and a combination of function keys arranged in one or more rows as illustrated. Outwards adjacent the keys 123 there is a display screen 134 capable of displaying multiple rows and columns of graphic symbols or of alphanumeric information or data. A handgrip module or handle module 135 is shown as extending toward the left hand side of the display module 120 with respect to the inner edge 131 as a base line. The handle module 135 includes a grip portion 136 which also functions as a battery compartment. A strap 137 may overlie the grip portion 136, such that a user may slip a hand between the grip portion 136 and the strap 137. The strap 137 preferably includes two strap halves which may be attached to each other at various lengthwise displaced distances by typical hook and loop fastening materials for adjustment.

Figure 17:
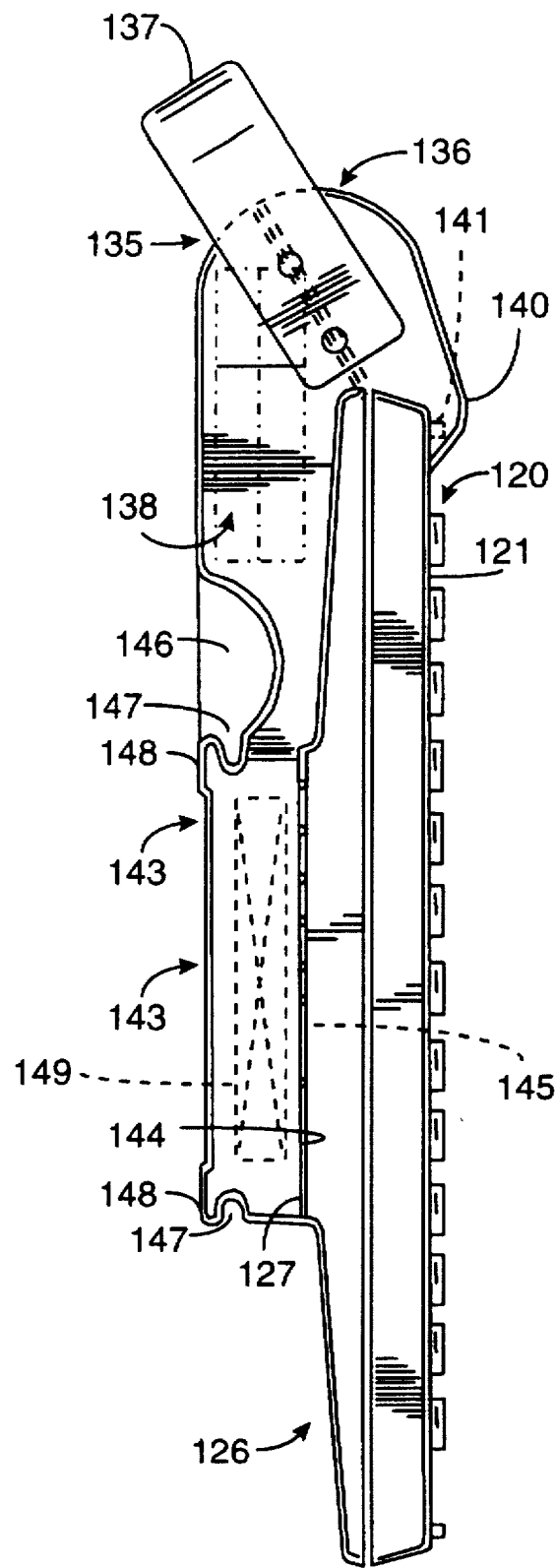
FIG. 17 is a side view of the display screen and handle and power supply modules of FIG. 16.

FIG. 17 is a side view of the display screen module 120 and handle module 135. A battery module 138 is disposed within the hand grip portion 135. An upper lip 140 of the grip portion 136 overlies the upper surface 121 of the display screen module 120. The upper lip 140 preferably engages a retainer ridge 141 disposed on the upper surface. An identical retainer ridge 141 may be disposed on the other side of the display screen module 120, such that the handle module 135 becomes reversible and may be attached to one side as shown, or to the other side of the display screen module, depending on the preference of the user. The handle module 135 has an elongate support portion 143 which extends along the lower surface 126 of the display screen module 120 and is preferably mounted to the central portion 127 of the lower surface 126. Electrical contact between the handle module 135 and the display screen module 120 may preferably be made across an interface 144 at the central portion 127. A plurality of spaced electrical contacts 145, disposed substantially in the plane of the interface 144 establish electrical and communication contact between the handle module 135 and the respective display screen module 120. A recess 146 in the support portion 143 is part of the grip portion. Adjacent the recess 146, oppositely spaced, parallel guide tracks 147 provide for the handle module to be slidably inserted into and to become electrically coupled to an external power supply and battery charger unit (not shown). A plurality of electrical power and communication contacts 148 establish contact for electrical power and signal communication with such a power supply and battery charger unit. A transceiver module 149 may be disposed within the support portion 143 for communication between an external data device (not shown) and the display screen module 120, such that data from the external data device may be displayed to be accessible to a user of the combination of the display screen 120 and the handle module 135. The described combination consequently refers to an alternate use of the display screen module 120 in addition to the previously described use of such a display screen module in combination with a keyboard assembly, as, for example, with respect to the data collection terminal unit 70.

Figure 18:
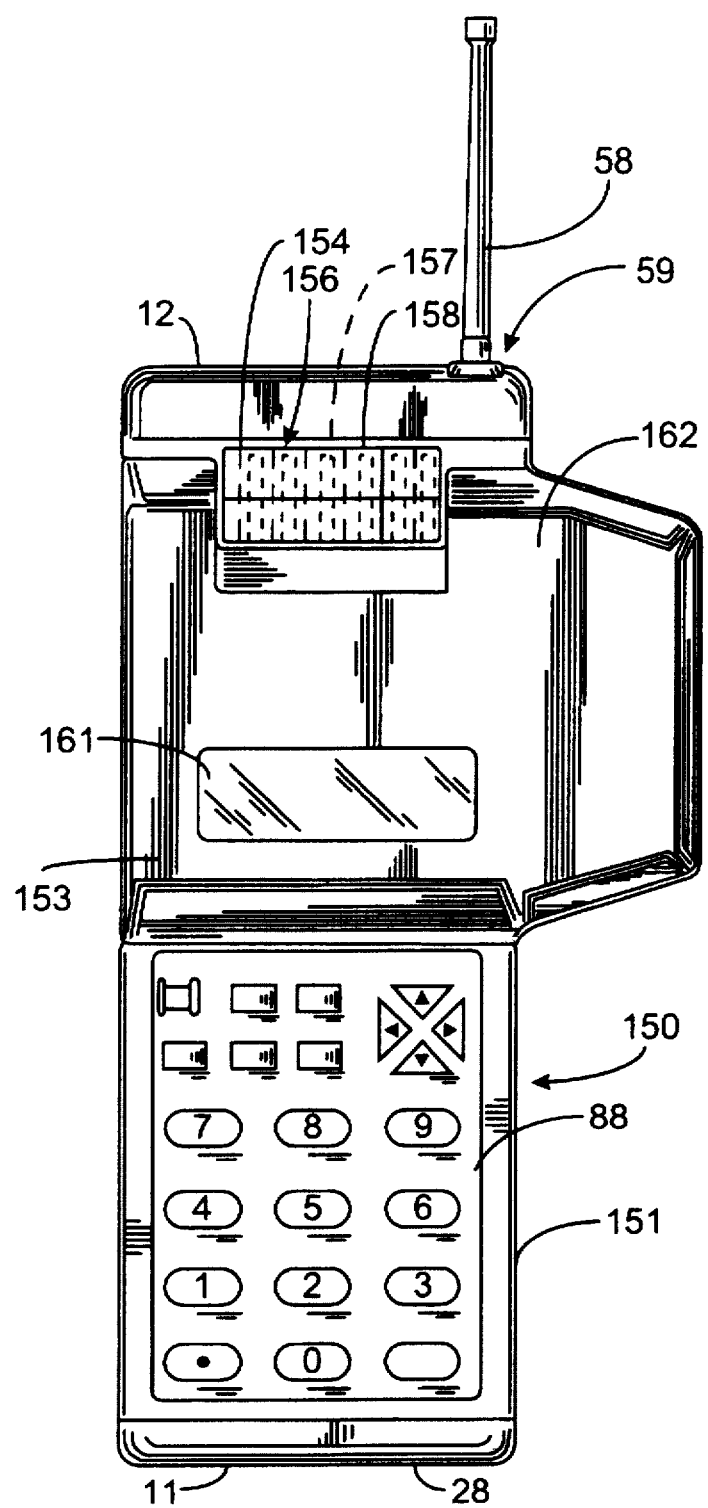
FIG. 18 is a frontal view of a data collection terminal unit showing an alternate embodiment of a keyboard module in combination with a display screen.

FIG. 18 is a frontal view of a data collection terminal unit 150 showing a keyboard module 151. The keyboard module 151 differs from a previously described keyboard module 87, for example, in that a display screen module 153 is pivotally attached to an outer end 154 of the keyboard module 151. The display screen module 153 accordingly necessarily requires a hinged attachment to a respective module, such as the keyboard module 151. A hinge 156 includes display screen hinge members 157 and complementary hinge discs 158 of the keyboard module 150. A hinged attachment of the display screen module 153 to the keyboard module 151 shows an interleaved disposition of the disc-like, spaced hinge members 157 with the complementary hinge discs 158 of the keyboard module 151. The respective hinge members 157 and hinge discs 158 may include laterally disposed electrical contact members disposed on respectively facing surfaces thereof to couple electrical power and data communication from the keyboard module 151 to the display screen module 153. It is contemplated that the display screen module be pivoted from a first, closed position to a preferred open position selected from a range of possible positions, such as may be suitable and most convenient to a user. The keyboard module 151 may include a keyboard, such as the keyboard 88 described with respect to FIG. 10, for example. Keyboards which differ in their configuration from the configuration of the keyboard 88 but which are identical in electrical contacts and interface arrangements and in physical dimensions may be inserted in lieu of the keyboard 88. The display screen module 153 has a first display screen 161 disposed in an outer surface 162 thereof. The size of the display screen 161 is one of choice, but may preferably be chosen to accommodate a typical numerical data display, hence be of a size substantially less than one which might occupy a major portion of the outer surface 162 of the display screen module 153. Similarly to the embodiment described in reference to FIG. 4, the data collection terminal unit 150 may include a transceiver unit 59 as indicated by the antenna 58.

Figure 19:
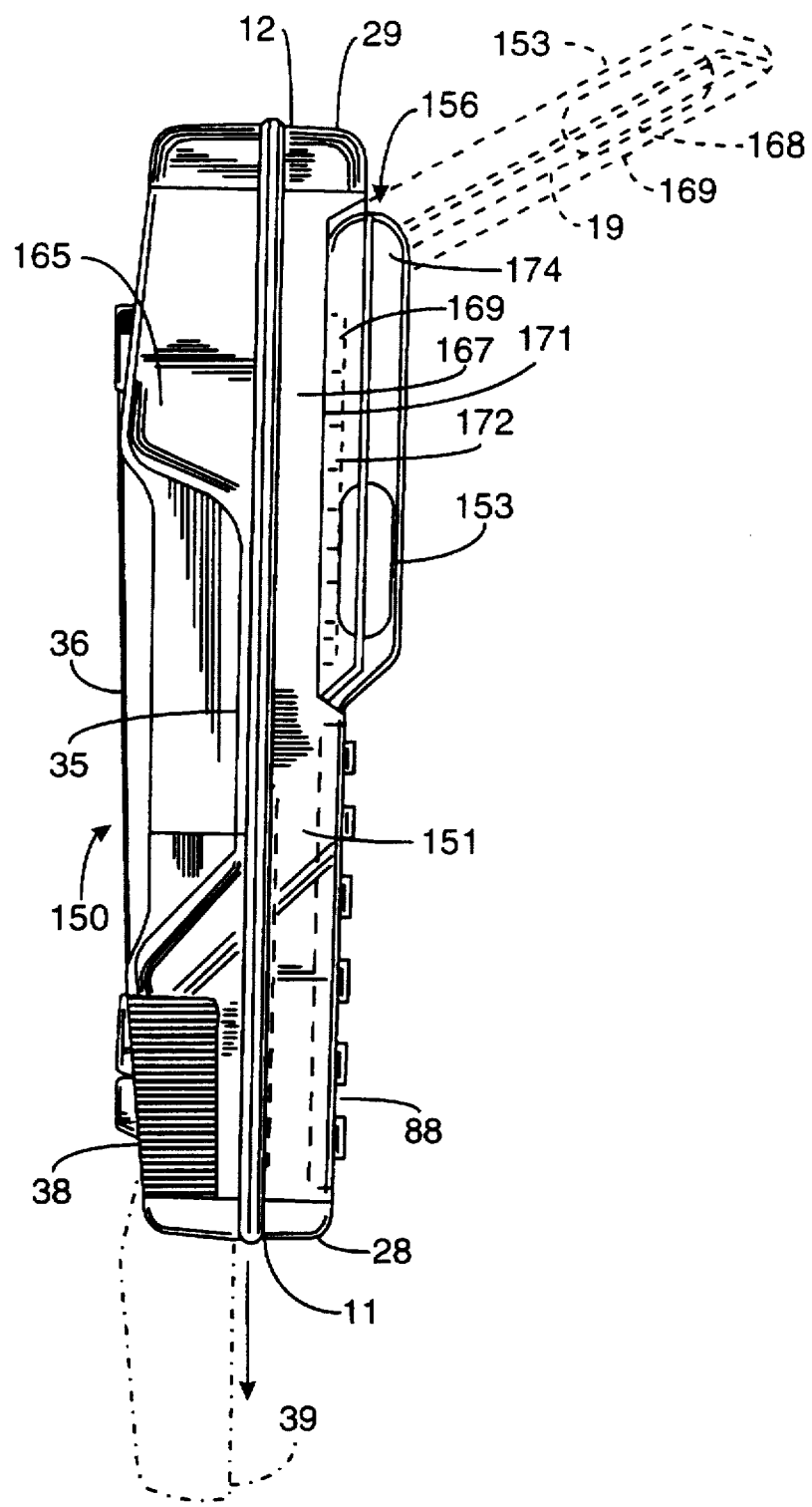
FIG. 19 is a side view of the data collection terminal unit shown in FIG. 18.

FIG. 19 is a side view of the data collection terminal unit 150. The terminal unit 150 includes a typical base module 165, similar to the base module 34.described with respect to FIG. 2 hereof. The base module 165 is shown as including the handgrip portion 35 and the strap 36. Resilient, shock absorbing end caps 28 and 29 are desirably attached to the respective inner and outer ends 11 and 12 of the data collection terminal unit 150. The display screen module 153 is shown in the first or closed position. The closed position is considered also the normal position in which the module 153 is disposed essentially against an outward disposed portion 167 of the keyboard module 151. The display screen module 153 may however be pivoted into an upward or open position within a range of open positions, substantially as indicated by the alternate position of the display screen module 153 shown in phantom lines. As the display screen module is pivoted to such upward position, a second display screen 19 disposed on the normally hidden underside 168 becomes visually accessible to a user. The display screen 19 is preferably recessed within an outer rim 169 of the display screen module 153. In the downward pivoted position the display screen module 153 may cover an auxiliary or second keyboard 171. The additional keys 172 of the second keyboard 171 may add alphabetical keys and function keys to be accessed by the user. In achieving the advantages sought by the present invention, both the first and the second keyboards 88 and 121 are removably mounted to the keyboard module 151 and may be exchanged for keyboards of identical lateral extent and having different key arrangements on a front surface thereof. Thus, the keyboard 171 may be exchanged for another keyboard having keys for different data or control input to the respective data collection terminal unit. Also, depending on the type of operation contemplated by the user of the data collection terminal unit 150, the user may employ the unit with the display screen module 153 in a downward position with the first keyboard 88 being the sole keyboard available for data entry and the first display screen 161 providing a corresponding visual indication of data made available to the user. In the alternative, the user may pivot the display screen module into an upward pivoted position, giving access to a second display screen 19 which is in comparison to the first display screen 161 larger in active area and capable of displaying a greater amount of information. The second keyboard 171 to which the user has gained access simultaneously with the access to the relatively larger display screen 19 desirably provides the capability of alphabetical data information. Electrical provisions in the hinge 156 may include position controlled contacts 174 which selectively activate the display screen 161 or the display screen 19 in response to an opening or closing of the display screen module 153 in the manner described The display screen module 153 differs from the previously described display screen modules in that the display screen module 153 is hingedly attached to the respective keyboard module 151. In this manner, the display screen module 153 is a sub-module of the keyboard module 151. However, it is also contemplated that the display screen module 153 may be interchanged with other display screen modules having similar spaced hinge members 157 to be compatible with the hinge discs 158 of the keyboard module 151.

Figure 20:
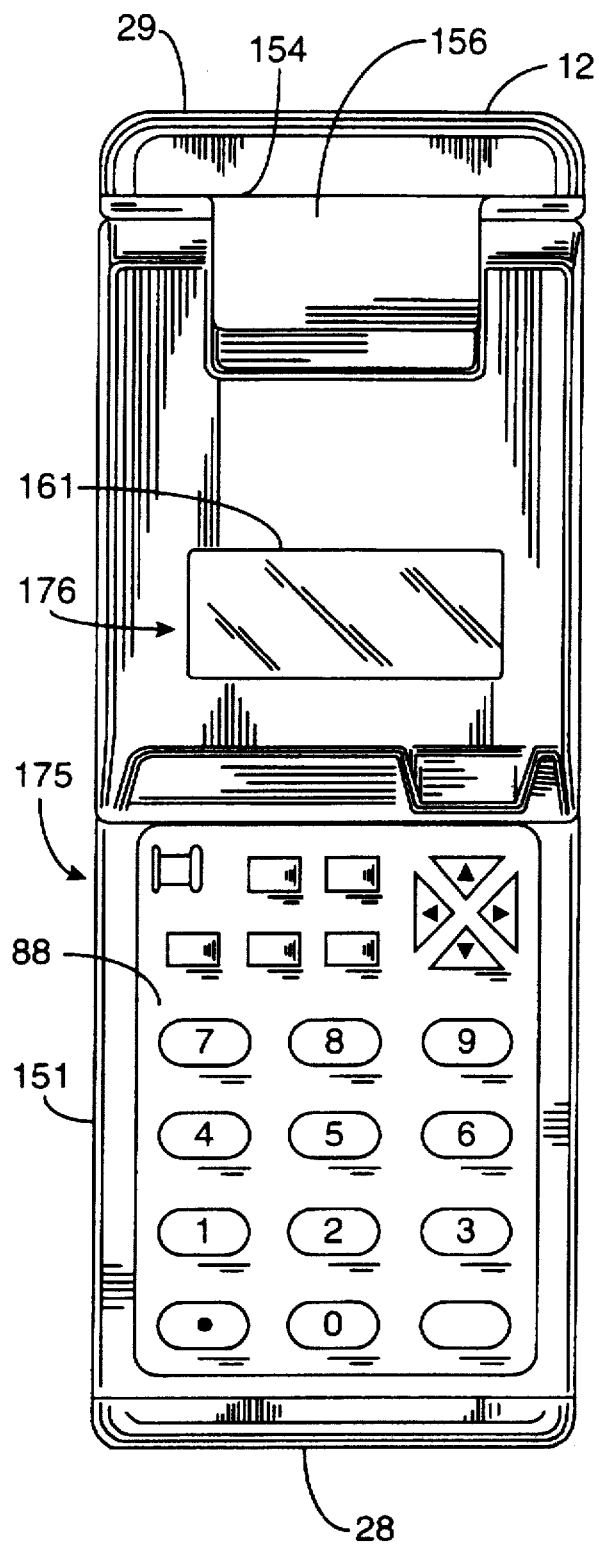
FIG. 20 is yet another embodiment of the data collection terminal unit shown in FIGS. 18 and 19, showing a screen display confined to the width of the keyboard module of the data collection terminal unit.

FIG. 20 is a frontal view of such alternate embodiment, showing a data collection terminal unit 175 which includes the described keyboard module 151. To the outer end 154 of the keyboard module 151 a display screen module 176 has been pivotally attached in lieu of the already described display screen module 153. In clear contrast to the display screen module 153, the display screen module 176 is laterally confined substantially to they overall width of the keyboard module 151 of the data collection terminal unit 175. The attachment of the display screen module 176 to the keyboard module 151 is identical to the attachment of the display screen module 153 at the hinge 156 as previously described. In the closed position of the display screen module 176, the first or outer display screen 161 may preferably be identical to the first display screen of the display screen module 153 in that in the closed position of the display screen module 176 only the first keyboard, preferably the numerical keyboard 88 is accessible to the user, and the size and display area of the display screen 161 is adapted to a desired display format commensurate with data input from the first keyboard, such as the keyboard 88.

Figure 21:
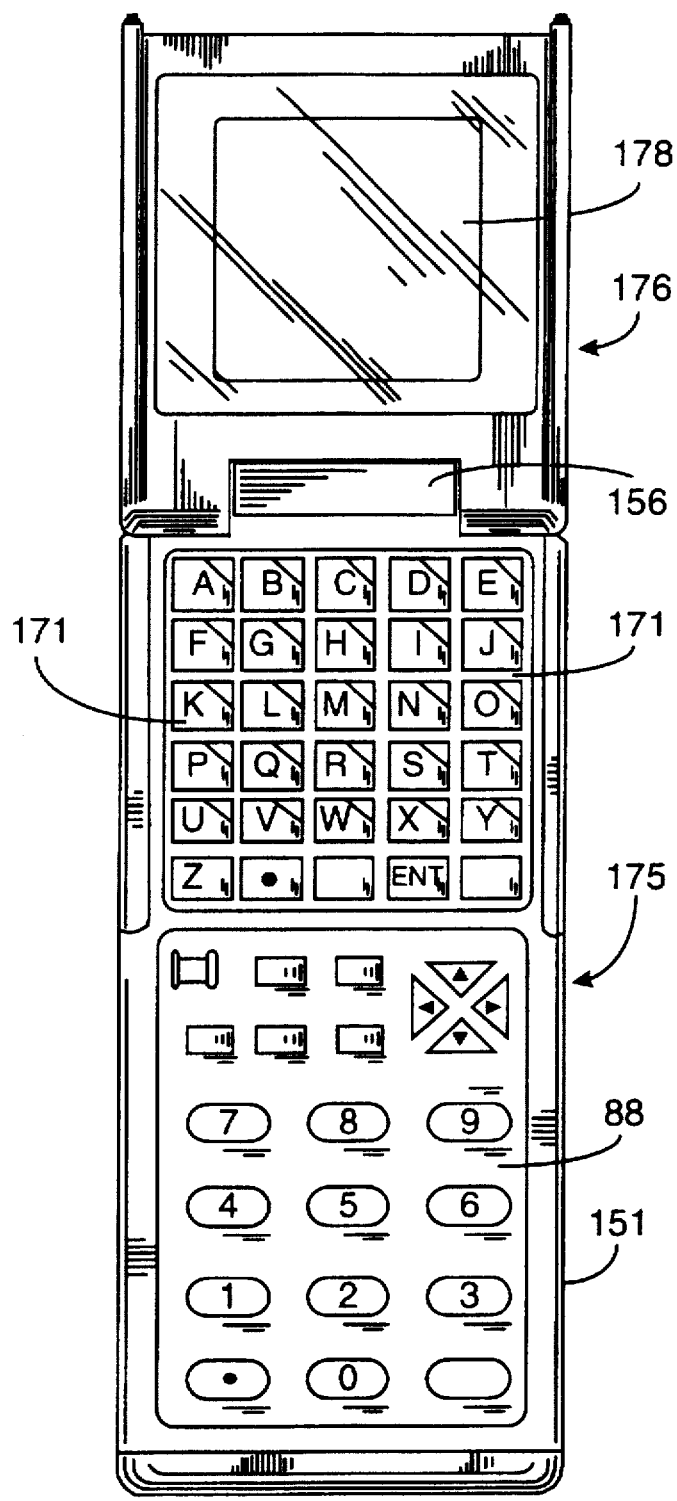
FIG. 21 is an alternate frontal view of the data collection terminal unit shown in FIG. 20, showing a pivotally mounted screen display in an open position, revealing a second screen display and a second keyboard.

FIG. 21 is an alternate frontal view of the data collection terminal unit 175, showing the display screen module 176 in an upward pivoted position. The pivoted position reveals the second keyboard 171 of the keyboard module 151 and makes a second display screen 178 of the display screen module 176 accessible to the user. Consequently, as shown in FIG. 21, the user may now manually enter data by manipulating any of the keys which make up the keyboards 88 and 171. The combination of the substantially numerical keyboard 88 and the substantially alphabetical keyboard 171 results in a complete alphanumerical keyboard. As described, pivoting the display screen module 176 From a closed position, as shown in FIG. 20, to the open position of FIG. 21 would be effective in one embodiment to switch displayed information from the first display screen 161 to the second display screen 178.

Various changes and modifications in the structure of the described embodiment are possible without departing from the spirit and scope of the invention as set forth in the claims.

What is claimed is:

1. A hand-held data collection terminal, comprising:
   (a) a bottom portion having a hand-grip portion to support the terminal on an open palm of a user;
   (b) an upper portion of said data collection terminal having a display screen;
   (c) the hand-grip portion of said bottom portion being positioned underneath said upper portion; and
   (d) said upper portion being of a size that is wider than the hand-grip portion.

2. A hand-held data collection terminal according to claim 1, further comprising an integrated optical indicia reader capable of reading optical indicia located externally of the hand-held data collection terminal.

3. A hand-held data collection terminal according to claim 2, wherein said optical indicia reader is positioned on an outer end of the data collection terminal.

4. A hand-held data collection terminal according to claim 3, wherein said optical indicia reader is positioned to read optical indicia located directly in front of the outer end of the hand-held data collection terminal.

5. A hand-held data collection terminal according to claim 3, wherein said optical indicia reader is positioned to read optical indicia located at least somewhat downwardly of the outer end of the hand-held data collection terminal.

6. A hand-held data collection terminal according to claim 2, wherein said optical indicia reader is positioned to read optical indicia located directly in front of an outer end of the hand-held data collection terminal.

7. A hand-held data collection terminal according to claim 2, wherein said optical indicia reader is positioned to read optical indicia located at least somewhat downwardly of the hand-held data collection terminal.

8. A hand-held data collection terminal according to claim 1, further comprising a laser scanner capable of reading optical indicia.

9. A hand-held data collection terminal according to claim 1, further comprising an input system, located on said upper portion, capable of accepting input from a user.

10. A hand-held data collection terminal according to claim 1, wherein said upper portion extends beyond both sides of the hand-grip portion.

11. A hand-held data collection terminal according to claim 1, further comprising a charge coupled device reader capable of reading optical indicia.

12. A hand-held data collection terminal according to claim 1, wherein said upper portion approximately twice as wide as the hand-grip portion.

13. A hand-held data collection terminal according to claim 1, wherein said upper portion is at least twice as wide as the hand-grip portion.

14. A hand-held data collection terminal according to claim 1, wherein the display screen is wider than the hand-grip portion.

15. A hand-held data collection terminal according to claim 14, wherein the display screen extends beyond both sides of the hand-grip portion.

16. A hand-held data collection terminal, comprising:
 (a) a bottom portion having a hand-grip portion to support the terminal on a palm of a user;
 (b) an upper portion, having a display screen, and further having a section located above and adjacent the hand-grip portion;
 (c) the hand-grip portion of said bottom portion being positioned underneath said upper portion; and
 (d) wherein the section of said upper portion located above and adjacent the hand-grip portion is of a size that is wider than the hand-grip portion.

17. A hand-held data collection terminal according to claim 16, further comprising an integrated optical indicia reader capable of reading optical indicia located externally of the hand-held data collection terminal.

18. A hand-held data collection terminal according to claim 17, wherein said optical indicia reader is positioned on an outer end of the data collection terminal.

19. A hand-held data collection terminal according to claim 18, wherein said optical indicia reader is positioned to read optical indicia located directly in front of the outer end of the hand-held data collection terminal.

20. A hand-held data collection terminal according to claim 18, wherein said optical indicia reader is positioned to read optical indicia located at least somewhat downwardly of the outer end of the hand-held data collection terminal.

21. A hand-held data collection terminal according to claim 17, wherein said optical indicia reader is positioned to read optical indicia located directly in front of an outer end of the hand-held data collection terminal.

22. A hand-held data collection terminal according to claim 17, wherein said optical indicia reader is positioned to read optical indicia located at least somewhat downwardly of the hand-held data collection terminal.

23. A hand-held data collection terminal according to claim 16, further comprising a laser scanner capable of reading optical indicia.

24. A hand-held data collection terminal according to claim 16, further comprising an input system, located on said upper portion, capable of accepting input from a user.

25. A hand-held data collection terminal according to claim 24, wherein said input system is a manually actuated keyboard.

26. A hand-held data collection terminal according to claim 25, wherein said keyboard is located on a section of said upper portion that is not above and adjacent the hand-grip portion.

27. A hand-held data collection terminal according to claim 26, wherein said keyboard is located on a section of said upper portion that has a width substantially equivalent to the width of the hand-grip portion.

28. A hand-held data collection terminal according to claim 16, wherein the section of said upper portion located above and adjacent the hand-grip portion extends beyond both sides of the hand-grip portion.

29. A hand-held data collection terminal according to claim 28, wherein said upper portion is at least approximately twice as wide as the hand-grip portion.

30. A hand-held data collection terminal according to claim 16, further comprising a charge coupled device reader capable of reading optical indicia.

31. A hand-held data collection terminal according to claim 16, wherein said upper portion is at least approximately twice as wide as the hand-grip portion.

32. A hand-held data collection terminal according to claim 16, further comprising an input system, located on the section of said upper portion located above and adjacent the hand-grip portion, capable of accepting input from a user.

33. A hand-held data collection terminal according to claim 16, wherein said display is located on the section of said upper portion located above and adjacent the hand-grip portion.

34. A hand-held data collection terminal, comprising:
 (a) a bottom portion having a hand-grip portion permitting support of the terminal on a palm;
 (b) an upper portion of said data collection terminal having a display screen;
 (c) the hand-grip portion of said bottom portion being positioned underneath said upper portion; and
 (d) said upper portion being of a size that is wider than the hand-grip portion.

35. A hand-held data collection terminal according to claim 34, further comprising an integrated indicia reader, the indicia reader reading information located externally of the hand-held data collection terminal.

36. A hand-held data collection terminal according to claim 35, wherein said indicia reader is positioned on an outer end of the data collection terminal.

37. A hand-held data collection terminal according to claim 36, wherein said indicia reader is positioned to read information located in front of the outer end of the hand-held data collection terminal.

38. A hand-held data collection terminal according to claim 36, wherein said indicia reader is positioned to read indicia located at least somewhat downwardly of the hand-held data collection terminal.

39. A hand-held data collection terminal according to claim 35, wherein said indicia reader is positioned to read information located in front of an outer end of the hand-held data collection terminal.

40. A hand-held data collection terminal according to claim 35, wherein said indicia reader is positioned to read indicia located at least somewhat downwardly of the hand-held data collection terminal.

41. A hand-held data collection terminal according to claim 34, further comprising a laser scanner capable of reading optical indicia.

42. A hand-held data collection terminal according to claim 34, further comprising an input system, located on said upper portion, capable of accepting input from a user.

43. A hand-held data collection terminal according to claim 34, wherein said upper portion extends beyond both sides of the hand-grip portion.

44. A hand-held data collection terminal according to claim 34, further comprising a charge coupled device reader capable of reading optical indicia.

45. A hand-held data collection terminal according to claim 34, wherein said upper portion is approximately twice as wide as the hand-grip portion.

46. A hand-held data collection terminal according to claim 34, wherein said upper portion is at least twice as wide as the hand-grip portion.

47. A hand-held data collection terminal according to claim 34, wherein the display screen is wider than the hand-grip portion.

48. A hand-held data collection terminal according to claim 47, wherein the display screen extends beyond both sides of the hand-grip portion.

49. A hand-held data collection terminal, comprising:

(a) a bottom portion having a hand-grip portion permitting support of the terminal on a palm of a user;

(b) an upper portion, having a display screen, and further having a section located above and adjacent the hand-grip portion;

(c) the hand-grip portion of said bottom portion being positioned underneath said upper portion; and (d) wherein the section of said upper portion located above and adjacent the hand-grip portion is of a size that is wider than the hand-grip portion.

50. A hand-held data collection terminal according to claim 49, further comprising an integrated indicia reader, the indicia reader reading indicia located externally of the hand-held data collection terminal.

51. A hand-held data collection terminal according to claim 50, wherein said indicia reader can read optical indicia.

52. A hand-held data collection terminal according to claim 51, wherein said indicia reader is a charge coupled device reader.

53. A hand-held data collection terminal according to claim 51, wherein said indicia reader is a laser scanner.

54. A hand-held data collection terminal according to claim 51, wherein said indicia reader is positioned to read information located at least somewhat downwardly of the hand-held data collection terminal.

55. A hand-held data collection terminal according to claim 51, wherein said indicia reader is pivotable.

56. A hand-held data collection terminal according to claim 55, wherein said pivotable indicia reader can be pivoted to read indicia located at least somewhat downwardly from the hand-held data collection terminal.

57. A hand-held data collection terminal according to claim 50, wherein said indicia reader is positioned on an outer end of the data collection terminal.

58. A hand-held data collection terminal according to claim 50, wherein said indicia reader is positioned to read indicia located in front of an outer end of the hand-held data collection terminal.

59. A hand-held data collection terminal according to claim 58, wherein said indicia reader is positioned to read indicia located at least somewhat downwardly of the outer end of the hand-held data collection terminal.

60. A hand-held data collection terminal according to claim 49, further comprising an input system, located on said upper portion, capable of accepting input from a user.

61. A hand-held data collection terminal according to claim 49, wherein the section of said upper portion located above and adjacent the hand-grip portion extends beyond both sides of the hand-grip portion.

62. A hand-held data collection terminal according to claim 49, further comprising an input system, the input system being located on the section of said upper portion that is located above and adjacent the hand-grip portion.

63. A hand-held data collection terminal according to claim 62, wherein said input system is a manually actuated keyboard.

64. A hand-held data collection terminal according to claim 63, wherein said keyboard is located on a section of said upper portion that is not above and adjacent the hand-grip portion.

65. A hand-held data collection terminal according to claim 64, wherein said keyboard is located on a section of said upper portion having a width less than that of said upper portion section located above and adjacent the hand-grip portion.

66. A hand-held data collection terminal according to claim 49, wherein said display is located on the section of said upper portion that is located above and adjacent the hand-grip portion.

67. A hand-held data collection terminal according to claim 49, wherein the display screen is wider than the hand-grip portion.

68. A hand-held data collection terminal according to claim 67, wherein the display screen extends beyond both sides of the hand-grip portion.

* * * * *